(12) United States Patent
Tsuge et al.

(10) Patent No.: US 7,674,316 B2
(45) Date of Patent: *Mar. 9, 2010

(54) METHOD FOR PRODUCING METALLIC IRON

(75) Inventors: Osamu Tsuge, Kobe (JP); Yasuhiro Tanigaki, Kobe (JP); Isao Kobayashi, Kobe (JP); Koji Tokuda, Kobe (JP); Shoichi Kikuchi, Kobe (JP); Shuzo Ito, Kobe (JP)

(73) Assignee: Midrex International B.V. Zurich Branch, Zurich (CH)

(*) Notice: Subject to any disclaimer, the term of this patent is extended or adjusted under 35 U.S.C. 154(b) by 0 days.

This patent is subject to a terminal disclaimer.

(21) Appl. No.: 12/183,947

(22) Filed: Jul. 31, 2008

(65) Prior Publication Data

US 2009/0031859 A1    Feb. 5, 2009

Related U.S. Application Data

(63) Continuation of application No. 10/482,403, filed as application No. PCT/JP02/05995 on Jun. 17, 2002, now abandoned.

(30) Foreign Application Priority Data

Jul. 12, 2001   (JP)   ............................... 2001-212714

(51) Int. Cl.
*C21B 11/00*   (2006.01)
(52) U.S. Cl. ...................................................... 75/484
(58) Field of Classification Search ................... 75/484
See application file for complete search history.

(56) References Cited

U.S. PATENT DOCUMENTS

| | | |
|---|---|---|
| 6,036,744 A | 3/2000 | Negami et al. |
| 6,126,718 A | 10/2000 | Sawa et al. |
| 6,210,462 B1 | 4/2001 | Kikuchi et al. |
| 6,251,161 B1 | 6/2001 | Tateishi et al. |
| 6,254,665 B1 | 7/2001 | Matsushita et al. |
| 6,413,295 B2 | 7/2002 | Meissner et al. |
| 6,506,231 B2 | 1/2003 | Negami et al. |

(Continued)

FOREIGN PATENT DOCUMENTS

CA   2348940 A1   5/2000

(Continued)

OTHER PUBLICATIONS

Patent Abstract of the Soviet Union, SU 1528062 A1, Aug. 15, 1994.

(Continued)

*Primary Examiner*—George Wyszomierski
*Assistant Examiner*—Tima M McGuthry-Banks
(74) *Attorney, Agent, or Firm*—Oblon, Spivak, McClelland, Maier & Neustadt, L.L.P.

(57) ABSTRACT

A hearth material is laid in the form of a layer on the hearth prior to supply of a mixture containing a carbonaceous reducing agent and iron oxides onto a hearth of a reduction melting furnace, thereby forming a renewable hearth capable of being renewed, and the metallic iron is produced while renewing a part or the whole of the renewable hearth, which has deteriorated during operation, with the hearth material.

15 Claims, 7 Drawing Sheets

U.S. PATENT DOCUMENTS

| | | |
|---|---|---|
| 6,592,649 B2 | 7/2003 | Kikuchi et al. |
| 6,602,320 B2 | 8/2003 | Fuji et al. |
| 6,630,010 B2 | 10/2003 | Ito et al. |
| 6,648,942 B2 * | 11/2003 | Hoffman et al. .............. 75/484 |
| 6,749,664 B1 | 6/2004 | Hoffman et al. |
| 2001/0027701 A1 * | 10/2001 | Ito et al. ...................... 75/484 |
| 2004/0083853 A1 | 5/2004 | Sugitatsu et al. |
| 2006/0070495 A1 | 4/2006 | Ito et al. |
| 2006/0096675 A1 | 5/2006 | Kikuchi et al. |
| 2006/0169103 A1 | 8/2006 | Ito et al. |
| 2007/0034055 A1 | 2/2007 | Tokuda et al. |
| 2007/0227301 A1 | 10/2007 | Ito et al. |

FOREIGN PATENT DOCUMENTS

| | | |
|---|---|---|
| CN | 1276838 A | 12/2000 |
| EP | 0976840 | 2/2000 |
| EP | 1 138 789 A1 | 10/2001 |
| EP | 1 187 941 | 3/2002 |
| EP | 1 201 772 A1 | 5/2002 |
| JP | 54340/1980 | 4/1980 |
| JP | 3-75721 | 3/1991 |
| JP | 06025758 A * | 2/1994 |
| JP | 2001-181719 | 7/2001 |
| RU | 2 093 492 C1 | 10/1997 |
| WO | WO 99/20801 | 4/1999 |
| WO | WO 00/29628 | 5/2000 |
| WO | WO 01/73137 | 10/2001 |

OTHER PUBLICATIONS

U.S. Appl. No. 12/183,871, filed Jul. 31, 2008, Kikuchi, et al.

* cited by examiner

METHOD FOR PRODUCING METALLIC IRON

CROSS REFERENCE TO RELATED APPLICATIONS

This application is a continuation of U.S. patent application Ser. No. 10/482,403 filed Jan. 9, 2004, abandoned May 1, 2008 which is the National Stage of PCT/JP02/05995, filed Jun. 17, 2002, the entire contents of which are incorporated herein by reference. This application also claims the benefit of priority under 35 U.S.C. §119 from Japanese patent application no. 2001-212714, filed Jul. 12, 2001.

TECHNICAL FIELD

The present invention relates to a method for producing metallic iron, and more particularly to a method for producing metallic iron, which is employed to produce the metallic iron by supplying a mixture containing a carbonaceous reducing agent, such as coal, and iron oxides, such as iron ore, onto a moving hearth of a reduction melting furnace of the moving hearth type, heating the mixture for reduction melting of the iron oxides, and then cooling thus-obtained metallic iron, and which is improved to be able to perform continuous operation of the above production process with stability while minimizing damages of the hearth or repairing damaged surface areas of the hearth during the operation.

BACKGROUND ART

As a method for producing reduced iron, there is known a process of charging a mixture of iron oxides, such as iron core, and a carbonaceous reducing agent, such as coal, onto a hearth of a rotary furnace or a reducing furnace of the moving hearth type, e.g., of the straight grate type, heating the mixture with radiation heat in the furnace while the mixture is moving in the furnace, and then discharging reduced iron, which is obtained by reduction of the iron oxides with the carbonaceous reducing agent, to the outside of the furnace from the hearth using any suitable discharging means, such as a screw mechanism.

In the case of providing the mixture as agglomerates in the form of, e.g., pellets, however, when the agglomerates are charged onto the hearth, powder generated from the agglomerates with drop impacts, etc. is accumulated on the hearth. The accumulated powder is heated and reduced along with the agglomerates, whereby the accumulated powder becomes powdery reduced iron and the agglomerates become granular reduced iron. The granular reduced iron is discharged out of the furnace by a discharging screw, while the powdery reduced iron is pressed into the hearth surface by the discharging screw. In continuous operation, therefore, a problem has occurred in that, as the amount of the reduced iron powder pressed into the hearth surface increases, the reduced iron powder coheres together under pressing forces repeatedly applied from the discharging screw and forms an iron sheet on the hearth surface. In the reducing furnace of the moving hearth type, since heating and reducing zones are at high temperatures, but a raw-material charging zone and a discharge zone are at relatively low temperatures, the iron sheet formed on the hearth surface tends to crack or warp because of such a temperature difference between the zones. Then, if the discharging screw is caught by the deformed iron sheet, a trouble, such as operation shutdown, has resulted.

A technique for solving the above problem has been previously proposed by the inventors (Japanese Patent 3075721).

According to the proposed technique, powder entering a furnace in company with agglomerates and generated from the agglomerates is accumulated on the surface of a hearth to form an iron oxide layer on the hearth, and a discharging device is intermittently or continuously moved toward the furnace ceiling during the operation, while adjusting a gap between the discharging device and the iron oxide layer formed on the moving hearth surface. It is hence possible to suppress powdery reduced iron from being pressed into the hearth surface by the discharging device, and to prevent formation of an iron sheet on the hearth. Further, the accumulated layer of the reduced iron powder is periodically scraped off so that the continuous operation is enabled. The proposed technique is intended to enable the operation to be continued by scraping off an iron sheet formed on the hearth surface and periodically renewing and repairing the hearth surface, but it is not intended to scrape off the hearth itself.

Also, as a method for producing metallic iron, there is known a process of charging a mixture of iron oxides and a reducing material into a reduction melting furnace of the moving hearth type, such as a rotary hearth furnace; heating the mixture with radiation heat in the furnace while the mixture is moving in the furnace; reducing the iron oxides with the reducing material; separating carburized, molten and aggregated slag; cooling reduced iron for solidification to form granular solid metallic iron; and then taking the granular solid metallic iron out of the furnace. In this connection, the inventors have previously proposed in, e.g., Japanese Unexamined Patent Application Publication 2000-144224, a technique for forming a vitreous berth layer made up of iron oxides, carbon and a silica compound on the hearth surface of a rotary hearth furnace, thereby preventing damages of the hearth caused by molten iron. However, since the vitreous layer deteriorates because of slag infiltration (permeation) and erosion when the operation is continued, there still remains a room for improvement to realize stable and continuous operation.

In view of the above-described state of the art, an object of the present invention is to provide a method for producing metallic iron, which can easily remove or repair the surface of a hearth even when metallic iron powder is buried in the hearth surface or even when the hearth surface suffers from slag infiltration and erosion, which can increase an availability factor and maintainability of the hearth, and which is suitably practiced for long-term continuous operation.

DISCLOSURE OF THE INVENTION

The present invention having succeeded in overcoming the problems described above resides in a method for producing metallic iron, the method comprising the steps of supplying a mixture containing a carbonaceous reducing agent and iron oxides onto a hearth of a reduction melting furnace of the moving hearth type, heating the mixture for reduction melting of the iron oxides, cooling thus-obtained metallic iron, and discharging the metallic iron to the outside of the furnace for recovery, wherein a hearth material is laid in the form of a layer on the hearth prior to supply of the mixture, thereby forming a renewable hearth capable of being renewed, and the metallic iron is produced while renewing a part or the whole of the renewable hearth, which has deteriorated during operation, with the hearth material.

Also, the present invention resides in a method for producing metallic iron, wherein a hearth material is laid in the form of a layer on the hearth prior to supply of the mixture, thereby forming a renewable hearth capable of being renewed, and the metallic iron is produced while a hearth surface is renewed by charging the hearth material to lie in the form of a layer on the renewable hearth which has deteriorated during operation, or by supplying the hearth material onto the surface of the deteriorated renewable hearth.

When practicing the method of the present invention, the metallic iron may be produced while filling the hearth material in dents to repair the dents, which are formed in the surface of the hearth layer during operation of the reduction melting furnace.

In the present invention, it is recommended that the whole or a part of the renewable hearth, which has deteriorated during operation, be removed periodically or continuously. Preferably, a thickness of the renewable hearth is adjusted. In a preferred embodiment of the present invention, the renewable hearth is renewed by supplying the hearth material after removing the renewable hearth. The hearth material preferably contains a substance having a high melting point and being corrosion-resistant against produced slag. Additionally, the hearth material preferably further contains a carbonaceous substance. It is recommended that the substance having a high melting point contain oxides including alumina and/or magnesia, or silicon carbide. In a preferred embodiment of the present invention, a sintering accelerator is mixed in the hearth material.

In the present invention, preferably, after charging the hearth material to lie in the form of a layer on the hearth to form the renewable hearth, an atmosphere modifier containing a powdery carbonaceous substance is laid in the form of a layer and the mixture is then supplied. Also, in a preferred embodiment of the present invention, the hearth material is mixed in the atmosphere modifier. In the present invention, preferably, after supplying a coolant to the renewable hearth, which has deteriorated during operation, to solidify molten iron residing on the surface of the renewable hearth, the renewable hearth is removed together with the residing iron, and the metallic iron is produced while renewing a part or the whole of the renewable hearth with the hearth material.

In the present invention, the renewable hearth may be softened before renewing the renewable hearth. Also, the atmosphere modifier may be laid in the form of two or more layers. When practicing the present invention, a carbonaceous material layer may be provided between the hearth and the renewable hearth or between the renewable hearth and a renewable hearth supplied onto the former renewable hearth.

BEST MODE FOR CARRYING OUT THE INVENTION

Embodiments of the present invention will be described below in detail with reference to the drawings. It is, however, to be noted that the following embodiments are illustrated merely as typical examples and the present invention is not limited to the illustrated examples.

Figure 1:
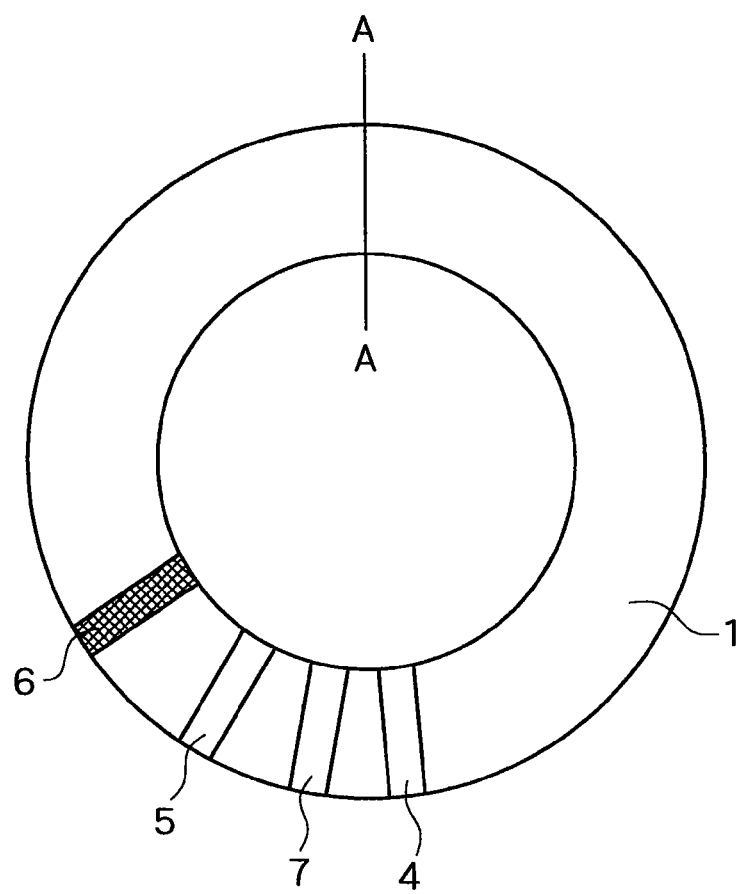
FIG. 1 is a schematic explanatory view showing one example of a reduction melting furnace of the circular moving hearth type to which the present invention is applied.
Figure 2:
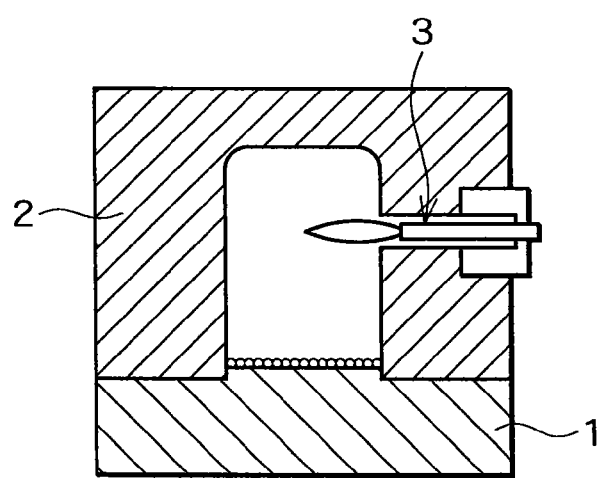
FIG. 2 is a sectional view taken along the line A-A in FIG. 1.
Figure 3:
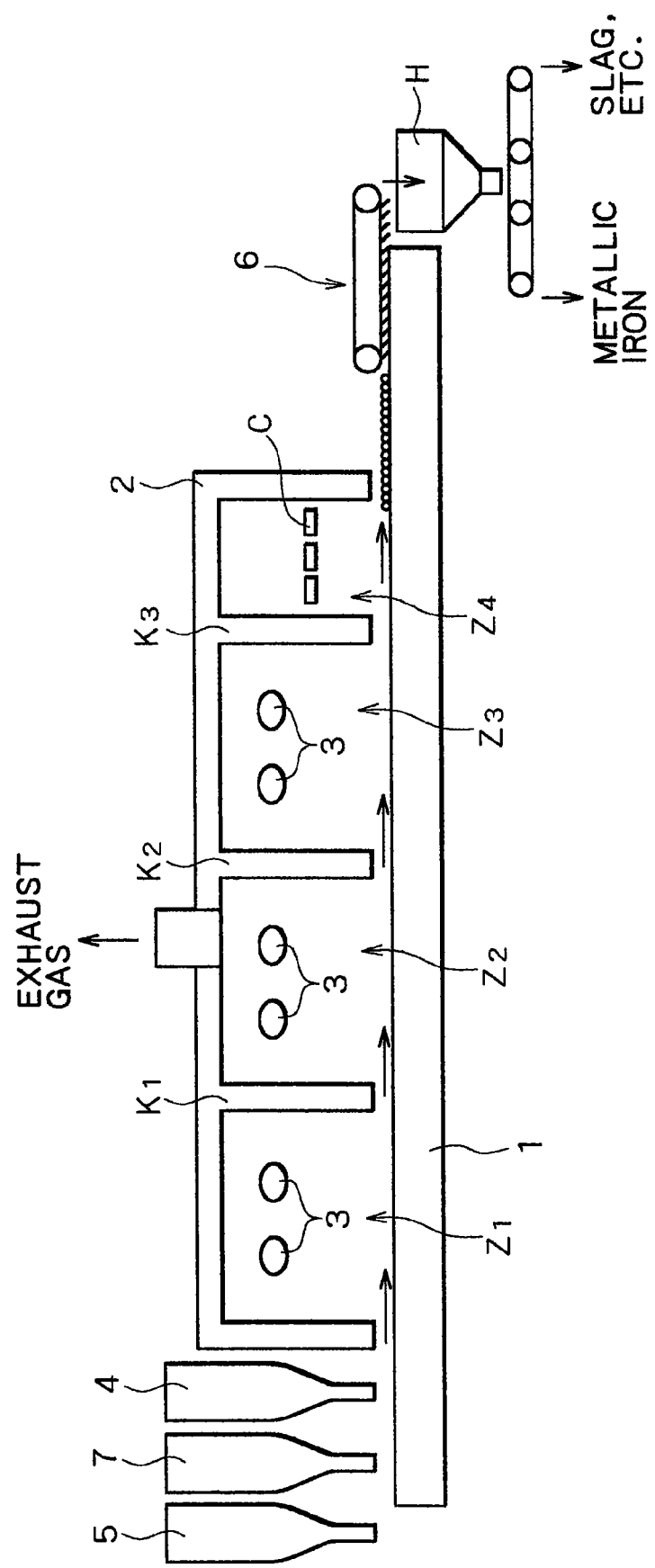
FIG. 3 is an explanatory view showing a section of the reduction melting furnace in the developed form as viewed in the rotating direction of a moving hearth in FIG. 1.

FIGS. 1 to 3 are schematic explanatory views showing one example of a reduction melting furnace of the moving hearth type (rotary furnace). The furnace is of a dome-shaped structure having a rotary moving hearth in the doughnut form. Specifically, FIG. 1 is a schematic plan view, FIG. 2 is an elevational sectional view taken along the line A-A in FIG. 1, and FIG. 3 is a schematic explanatory view showing a section of the reduction melting furnace in the developed form as viewed in the rotating direction of the rotary moving hearth in FIG. 1 for easier understanding. In the drawings, numeral 1 denotes a rotary hearth, and 2 denotes a furnace body covering the rotary hearth. The rotary hearth 1 is constructed such that it can be driven by a driving device (not shown) to rotate at a proper speed.

As shown in FIG. 2, by way of example, a plurality of combustion burners 3 are disposed at appropriate places in a wall surface of the furnace body 2. Combustion heat and radiation heat generated by the combustion burners 3 are transmitted to a mixture containing a carbonaceous reducing agent and iron oxides (hereinafter referred to also as a "raw-material mixture"), which is placed on the rotary hearth 1, for performing heating reduction of the raw-material mixture. In the following, the present invention is described in connection with the case of employing, as the raw-material mixture, agglomerates containing a carbonaceous reducing agent and iron oxides (hereinafter referred to as "raw-material agglomerates"). However, the present invention is not limited to the use of agglomerates, but may use a powdery raw-material mixture as well. Also, the agglomerates can be prepared in various shapes, such as pellets and briquettes.

FIG. 3 shows a preferred example of the furnace body 2. The interior of the furnace body 2 is divided by partition walls $K_1$ to $K_3$ into a plurality of zones ranging from a reducing zone $Z_1$ to a cooling zone $Z_4$. A raw-material agglomerate charging means 4, an atmosphere modifier charging means 7, and a hearth material charging means 5 are disposed in an opposed relation to the rotary hearth 1 at the upstream side in the rotating direction of the furnace body 2. A discharging device 6 is provided at the most downstream side in the rotating direction (in other words, at the side immediately upstream of the charging means 5 because of the rotary structure).

In operation of such a reduction melting furnace, the rotary hearth 1 is rotated at a predetermined speed, and the raw-material agglomerates are supplied from the charging means 4 onto the rotary hearth 1 such that a layer of the raw-material agglomerates has a proper thickness. The raw-material agglomerates charged on the rotary hearth 1 are subjected to combustion heat and radiation heat generated by the combustion burners 3 while moving in the reducing and melting zones $Z_1$ to $Z_3$. Iron oxides in the raw-material agglomerates are reduced under heating with the aid of carbon monoxide generated upon the reaction between the iron oxides and the carbonaceous reducing agent in the raw-material agglomerates. Then, reduced iron produced with almost complete reduction of the iron oxides is further heated under a carbon-rich atmosphere, whereby granular molten metallic iron is obtained through a process in which the reduced iron is carburized, melted and aggregated while separating from slag produced as a by-product. Thereafter, the granular molten metallic iron is cooled by any suitable cooling means C in the cooling zone $Z_4$ for solidification, and is successively scraped out by the discharging device 6 provided downstream of the cooling zone $Z_4$. Simultaneously, the slag produced as a by-product is also discharged. After passing a hopper H, the granular metallic iron and the slag are separated from each other with any suitable separating means (such as a sieve or a magnetic screening device). Finally, granular metallic iron having iron purity of not less than about 95%, more preferably of not less than about 98%, and containing a very small amount of slag components can be obtained.

In the present invention, when producing metallic iron of high purity using the reduction melting furnace of the moving hearth type as described above, the prime aim is particularly focused on protection of the hearth constituted as the rotary hearth 1. The following description is, therefore, made of primarily methods for repairing and renewing the hearth. As a matter of course, however, the construction of the reduction melting furnace of the moving hearth type, to which the present invention is applied, is not limited to the shape and structure shown in FIGS. 1 to 3. So long as the reduction melting furnace includes a moving hearth as a constituent element, various reduction melting furnaces of the moving hearth type having any other structures, e.g., the straight grate type, can also be effectively employed in the present invention.

The present invention is implemented in a plant for producing metallic iron, in which a mixture containing iron oxides, e.g., iron ore, as an iron source and a carbonaceous reducing agent, e.g., coal, serving as a reducing agent for the iron oxides are supplied onto the hearth of the reduction melting furnace of the moving hearth type and heated for reduction melting of the iron oxides, and thus-obtained metallic iron is cooled and discharged to the outside of the furnace. Then, the present invention is intended to protect the hearth that serves as a support layer when the metallic iron is successively produced through the steps of heating, reducing, carburizing and melting, and to enable stable operation to be continued by renewing the surface of the hearth formed with charging of the raw-material mixture.

The basic concept of the present invention resides in a method for producing metallic iron, the method comprising the steps of supplying a mixture containing a carbonaceous reducing agent and iron oxides onto a hearth of a reduction melting furnace of the moving hearth type, heating the mixture for reduction melting of the iron oxides, cooling thus-obtained metallic iron, and discharging the metallic iron to the outside of the furnace for recovery, wherein a hearth material is laid in the form of a layer on the hearth prior to supply of the mixture, thereby forming a renewable hearth, and the metallic iron is produced while renewing a part or the whole of the renewable hearth, which has deteriorated during operation, with the hearth material.

Figure 4:
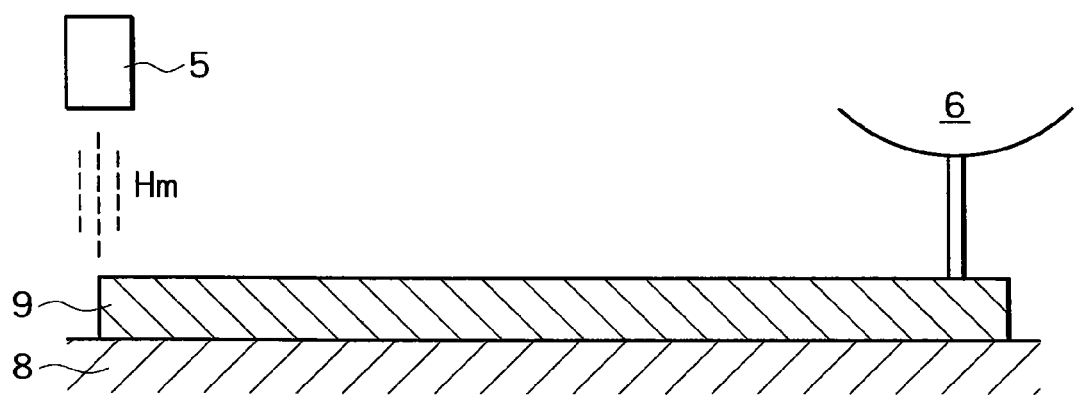
FIG. 4 is a schematic explanatory view showing a state in which a renewable hearth is initially formed.
Figure 5:
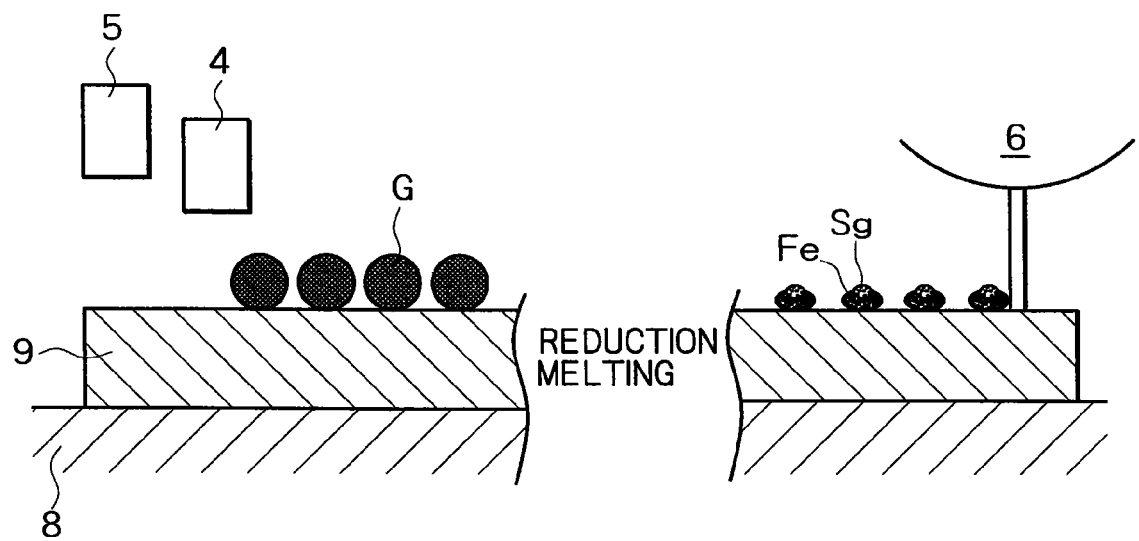
FIG. 5 is a schematic explanatory view showing an ordinary operation.

FIGS. 4 and 5 are schematic sectional explanatory views showing one preferred embodiment of the present invention. At the start of the operation, the hearth material is laid in the form of a layer on a hearth refractory 8 of the reduction melting furnace of the moving hearth type prior to supply of the raw-material agglomerates, thereby forming a renewable hearth 9 that is capable of being renewed as required. The method of charging the hearth material is not limited to a particular one, and it is recommended that the hearth material be charged to lie on the hearth refractory at a uniform thickness by using the hearth material supply apparatus 5 while the hearth is rotated. It is also recommended to level and compact the hearth material by using the discharging device 6, while the hearth is rotate, after charging the hearth material on the hearth refractory. This is because the renewable hearth having an appropriate strength and smoothness can be formed at any desired thickness. Alternatively, a separate leveling device (not shown) may be used instead of the discharging device 6.

The thickness of the renewable hearth is not limited to a particular one, but it is recommended that the hearth thickness be preferably not less than 5 mm, more preferably not less than 10 mm, from the viewpoints of suppressing the molten slag from infiltrating to the hearth refractory and giving the renewable hearth a sufficient strength endurable to the operations of charging the raw-material agglomerates or discharging the metallic iron as a product and the slag.

After forming the renewable hearth, raw-material agglomerates G are supplied onto the renewable hearth by using the raw-material supply apparatus 4 while the hearth is moved. As described above with reference to FIGS. 1 to 3, the raw-material agglomerates are subjected to combustion heat and radiation heat generated by the burners while moving in the zones $Z_1$ to $Z_3$ of the reduction heating furnace, whereby iron oxides in the raw-material agglomerates are reduced in a solid state and become reduced iron. The reduced iron is further heated so that it is carburized to have a lower melting point and then melted. The molten iron coheres together to aggregate and grow into relatively large granular metallic iron Fe while separating from slag that is produced as a by-product and aggregated into by-product slag Sg. Then, the granular metallic iron Fe and the by-product slag Sg are cooled at the position immediately upstream of the discharging device as described above, and are moved to the position where the discharging device is installed. Thereafter, the granular metallic iron Fe and the slag Sg both solidified under the cooling are scraped out of the hearth surface by the discharging device.

Figure 6:
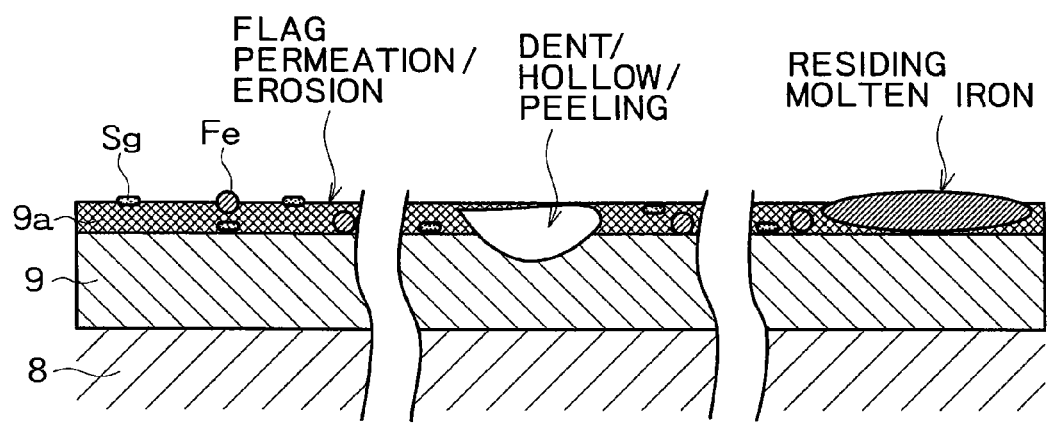
FIG. 6 is a schematic explanatory view showing deterioration of the renewable hearth.

The production of metallic iron is continued in that way. With the operation continued for a long period, however, the renewable hearth deteriorates gradually and the stable production of metallic iron cannot be continued any more. FIG. 6 shows examples of deterioration of the renewable hearth. For example, a part of the molten slag produced as a by-product in the above-described reduction melting process contacts with the renewable hearth and penetrates into the renewable hearth. Also, with continued operation, the amount of slag penetrated into the renewable hearth increases, whereupon the renewable hearth is corroded or softened because of a reduction in melting point thereof, thus resulting in metamorphic expansion. As a result, the renewable hearth loses the strength and smoothness required for the hearth, and the stable production of metallic iron can no longer be continued. If the infiltration of slag further proceeds, the spread of the slag infiltration and erosion reaches the hearth refractory. This eventually leads to such an event that the furnace must be stopped and the hearth refractory must be repaired.

Further, with the operation of discharging the granular metallic iron Fe and the slag Sg both having been solidified, the metallic iron Fe and the slag Sg are often buried into the renewable hearth under pressing by the discharging device. In particular, the granular metallic iron Fe and the slag Sg tend to be easily buried into the renewable hearth when it is softened as described above. The slag Sg buried in the renewable hearth is moved back into the furnace with the rotation of the hearth and melted again because of being subjected to high temperature. Therefore, the buried slag Sg penetrates into the renewable hearth similarly to the above-mentioned molten slag. The metallic iron Fe buried in the renewable hearth is also moved back into the furnace with the rotation of the hearth and melted again because of being subjected to high temperature. Therefore, the buried metallic iron coheres with each other or with metallic iron Fe produced from the newly supplied raw-material agglomerates G, and grow into enlarged metallic iron. With a further increase in size of the metallic iron, the thus-enlarged metallic iron cannot be sufficiently cooled and solidified by the cooling ability available in the cooling zone, and hence reaches a discharge section while it is in a state of molten iron. It is difficult to discharge the metallic iron in such a state out of the furnace by the discharging device. Though depending on the type of discharging means used, the metallic iron Fe and the slag Sg that tend to be easily buried into the renewable hearth are often in the form of fine metallic iron Fe and slag Sg that are not sufficiently aggregated and grown in the above-described melting process.

Further, in the discharging operation, the renewable hearth having expanded metamorphically is sometimes caught by the discharging device and is partly peeled off. In other cases, the enlarged metallic iron residing in the renewable hearth is removed and a dent is formed there. The metallic iron Fe and the slag Sg are apt to reside in the thus-formed dent, thereby accelerating the slag infiltration into the renewable hearth and rendering the metallic iron to increase its size and to remain molten.

Renewing of the renewable hearth performed in the present invention is intended to restore the function of the renewable hearth and to continue the stable operation of producing the metallic iron. Examples of the renewing method are shown in FIGS. 7 to 10.

Figure 7:
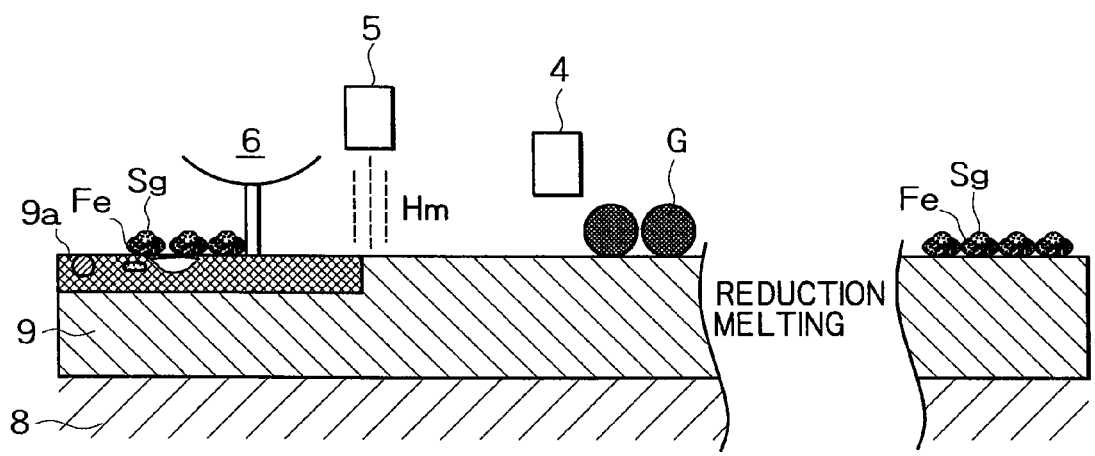
FIG. 7 is a schematic explanatory view showing a state in which the renewable hearth is renewed.

In FIG. 7, numeral 9a denotes a deteriorated area of the renewable hearth 9. After discharging the metallic iron Fe and the slag Sg to the outside of the furnace by the discharging device 6, the hearth material is charged to the surface of the renewable hearth deteriorated area 9a prior to supply of the raw-material agglomerates G so that the stable operation of producing the metallic iron can be continued. At that time, the lower end of a blade of the discharging device is positioned on the surface of the renewable hearth deteriorated area 9a, and with the rotation of the hearth, it removes a part of the metallic iron Fe and the slag Sg residing on a surface layer of the renewable hearth deteriorated area and presses the hearth material, which is newly supplied onto the surface of the renewable hearth deteriorated area, into the surface layer of the renewable hearth deteriorated area, thereby restoring the function of the renewable hearth deteriorated area. The charging of the hearth material is not necessarily continued at all times, but may be stopped when the function of the renewable hearth deteriorated area is restored. Then, the similar renewing step may be repeated in a stage in which deterioration of the renewable hearth has progressed again with further continuation of the operation.

Stopping the production of the metallic iron to carry out the step of renewing the renewable hearth results in a reduction of the availability factor. However, when the renewable hearth is badly deteriorated, e.g., when a large dent is formed in the renewable hearth, this remarkably accelerates the slag infiltration into the renewable hearth and renders the metallic iron to increase its size and to remain molten as described above. Accordingly, the production of the metallic iron may be stopped once.

With the above-mentioned renewing method, since the lower end of the blade of the discharging device is positioned on the surface of the renewable hearth deteriorated area 9a, most of the hearth material other than a part thereof, which is pressed into the renewable hearth deteriorated area, is discharged out of the furnace by the discharging device. The amount of the hearth material consumed is therefore increased.

Figure 8:
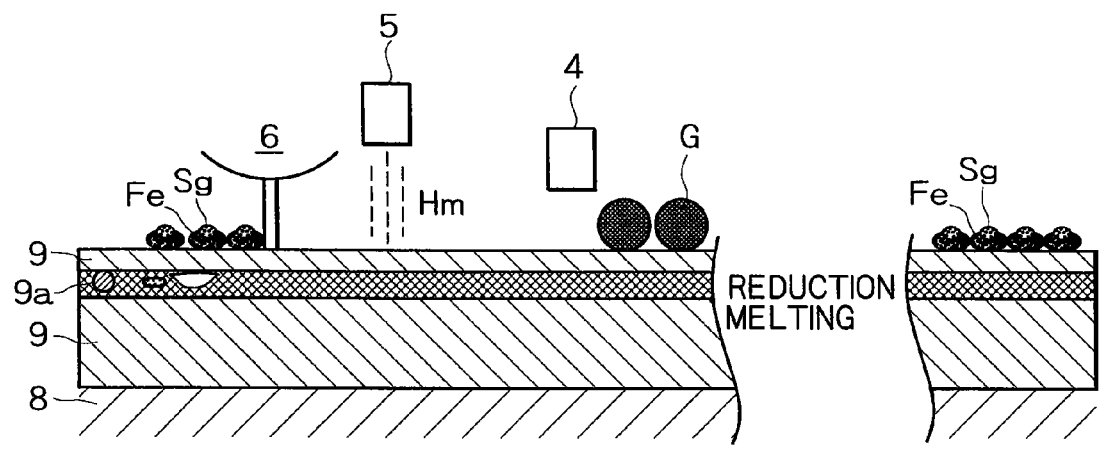
FIG. 8 is a schematic explanatory view showing a state in which the renewable hearth is renewed.

FIG. 8 shows another example of the renewing method. After discharging the metallic iron Fe and the slag Sg out of the furnace by the discharging device 6, the hearth material is charged so as to lie in the form of a layer on the surface of the renewable hearth deteriorated area 9a prior to supply of the raw-material agglomerates G so that the stable operation of producing the metallic iron can be continued. At that time, the lower end of the blade of the discharging device is positioned at a level slightly away above the surface of the renewable hearth deteriorated area 9a. Therefore, a part of the metallic iron Fe and the slag Sg residing on the surface layer of the renewable hearth deteriorated area cannot be removed, but a new layer of renewable hearth is formed on the renewable hearth deteriorated area with the newly charged hearth material, thereby restoring the function of the renewable hearth. The charging of the hearth material is not necessarily continued at all times, but may be stopped when the new layer of renewable hearth is formed.

The thickness of the new layer of renewable hearth laid on the renewable hearth deteriorated area is not limited to a particular one, but it is preferably not less than 2 mm to prevent the new layer of renewable hearth from being adversely affected by the renewable hearth deteriorated area. Then, the similar renewing step may be repeated in a stage in which deterioration of the renewable hearth has progressed again with further continuation of the operation.

With the above-mentioned renewing method, the amount of the hearth material consumed can be reduced by stopping the charging of the hearth material at the time when the new layer of renewable hearth is formed. Additionally, as with the case of FIG. 7, the production of the metallic iron may be stopped once to carry out the step of renewing the renewable hearth.

As another renewing method, the hearth material may be filled in a dent formed in the surface of the hearth layer during the operation of the reduction melting furnace.

Figure 9:
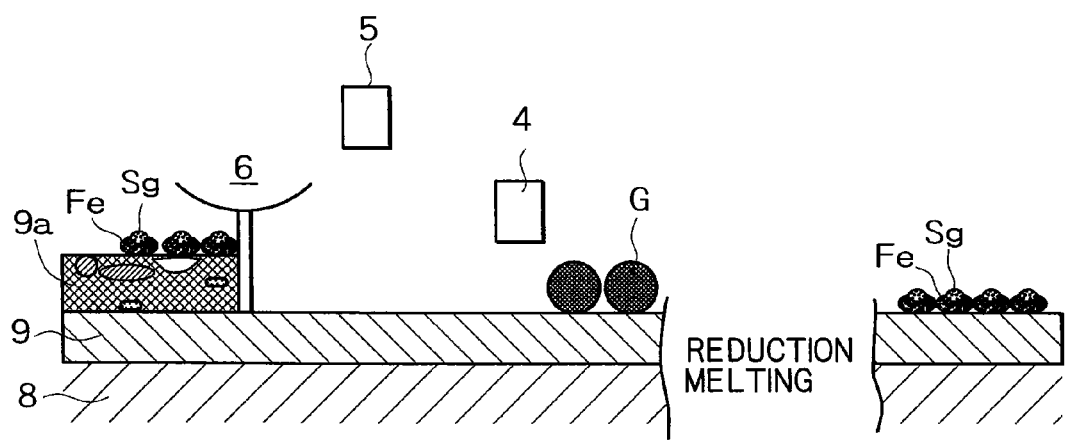
FIG. 9 is a schematic explanatory view showing a state in which the renewable hearth is renewed.

FIG. 9 shows still another example of the renewing method. After discharging the metallic iron Fe and the slag Sg out of the furnace by the discharging device 6, a part or the whole of the renewable hearth deteriorated area 9a is removed prior to supply of the raw-material agglomerates G for causing a new surface of the renewable hearth with less deterioration or free from deterioration to appear, so that the function of the renewable hearth can be restored and the stable operation of producing the metallic iron can be continued. The method of removing the renewable hearth deteriorated area is not limited to a particular one, and any suitable removing means (not shown) can be used. When using the discharging device 6 to remove the renewable hearth deteriorated area, it is possible to discharge the metallic iron Fe and the slag Sg out of the furnace, and simultaneously to remove the renewable hearth deteriorated area. Then, the similar renewing step may be repeated in a stage in which deterioration of the renewable hearth has progressed again with further continuation of the operation. Further, in a stage in which the thickness of the renewable hearth has reached a minimum limit, the hearth material may be newly charged for restoring the renewable hearth to have the predetermined thickness. Though not shown, whenever the renewable hearth deteriorated area is removed, the hearth material may be newly charged for restoring the renewable hearth to have the predetermined thickness.

With the above-mentioned renewing method, the amount of the hearth material consumed is reduced as with the case of FIG. 8. In some cases, however, a difficulty arises in removing the renewable hearth deteriorated area into a flat and uniform state and an addition of the hearth material is required depending on the nature or the degree of deterioration of the renewable hearth, such as experienced when the renewable hearth is unevenly deteriorated or when deterioration penetrates a deep portion of the renewable hearth in some places. Additionally, as with the case of FIG. 7, the production of the metallic iron may be stopped once to carry out the step of renewing the renewable hearth.

Figure 10:
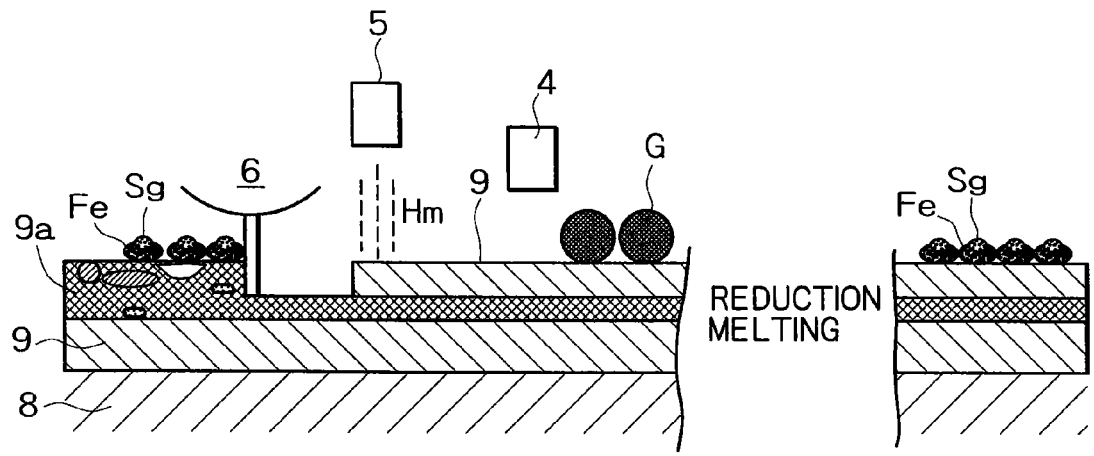
FIG. 10 is a schematic explanatory view showing a state in which the renewable hearth is renewed.

FIG. 10 shows still another example of the renewing method. After discharging the metallic iron Fe and the slag Sg out of the furnace by the discharging device 6, a part or the whole of the renewable hearth deteriorated area 9a is removed prior to supply of the raw-material agglomerates G, and the hearth material is charged to lie in the form of a layer on an exposed surface of the renewable hearth after the removal, so that the function of the renewable hearth can be restored and the stable operation of producing the metallic iron can be continued. As with the case of FIG. 9, the method of removing the renewable hearth deteriorated area is not limited to a particular one. Also, as with the case of FIG. 8, the thickness of a new layer of renewable hearth laid on the surface exposed after the removal is not limited to a particular one, but it is preferably not less than 2 mm to prevent the new layer of renewable hearth from being adversely affected by the remaining renewable hearth deteriorated area. Then, the similar renewing step may be repeated in a stage in which deterioration of the renewable hearth has progressed again with further continuation of the operation.

With the above-mentioned renewing method, a difficulty arises sometimes in removing the renewable hearth deteriorated area into a flat and uniform state as with the case of FIG. 9, but there occurs no problem because a renewable hearth is newly formed on the exposed surface of the underlying renewable hearth.

In addition, as with the case of FIG. 7, the production of the metallic iron may be stopped once to carry out the step of renewing the renewable hearth. Further, in the cases of FIGS. 9 and 10, when removing a part or the whole of the renewable hearth deteriorated area, a portion of the renewable hearth which is not deteriorated may also be removed together.

The operation of removing the metallic iron and the slag residing on the surface layer of the renewable hearth or pressing a new hearth material into the surface layer of the renewable hearth deteriorated area, or the means for removing the renewable hearth deteriorated area can be performed by using not only a discharging device such as of the scraper or screw type, but also any other suitable removing means such as a milling machine.

Further, the means for adjusting the thickness of the renewable hearth is not limited to a particular one, but may be a discharging device used for removing the metallic iron and the slag residing on the surface layer of the renewable hearth, or a removing device for removing the deteriorated renewable hearth, or a leveling device. Anyway, the thickness of the renewable hearth can be adjusted by regulating the spacing between the lower end (e.g., the blade end position) of such a device, which is installed in the furnace, and the renewable hearth.

Moreover, the method of ascending and descending the discharging device or the removing means is not limited to a particular one, but may be implemented using a jack, a hydraulic or pneumatic cylinder, etc.

While several examples of the method of renewing the renewable hearth have been described above, any suitable renewing method other than the above-illustrated ones may also be employed, or those methods may be combined with each other.

Because the renewable hearth is exposed to high temperatures in the furnace and is subjected to infiltration and erosion of the molten slag as described above, the hearth material is preferably a substance having a high melting point and being corrosion-resistant against the molten slag. Such a hearth material contains, e.g., oxides including alumina and/or magnesia, or silicon carbide. Any other suitable substance may also be used so long as it has the above-mentioned property. In the present invention, the hearth material may be one or two or more kinds of materials in proper combination; namely, there is no particular limitation on the number of kinds of hearth materials used. Also, by using the above-mentioned hearth material to form the renewable hearth, deterioration of the renewable hearth due to erosion by the molten slag can be delayed. As a result, it is possible to increase the availability factor of the plant and to reduce the amount of the hearth material used.

Further, when the hearth material contains a carbonaceous substance (when the hearth material is a mixture of a corrosion-resistant material having a high melting point and a carbonaceous substance), the renewable hearth has a porous structure as a result of burning of the carbonaceous substance in the furnace, whereby metamorphic expansion attributable to infiltration of the molten slag can be suppressed and the surface of the renewable hearth can be maintained in a flat and uniform state for a longer time. The porous structure of the renewable hearth is also preferable in points of facilitating removal of the renewable hearth deteriorated area when the renewable hearth is renewed, and reducing a wear of the blade end of the means for removing the renewable hearth deteriorated area, e.g., the discharging device.

A mixing ratio of the material having a high melting point to the carbonaceous substance is not limited to a particular value, but it is recommended to fall in the range of preferably from 20:80 to 80:20 and more preferably from 70:30 to 30:70. If the amount of the carbonaceous substance is too small, the number of pores in the renewable hearth would be reduced, thus resulting in a reduction of the effect of suppressing metamorphic expansion attributable to infiltration of the molten slag and a difficulty in removing the renewable hearth deteriorated area. Conversely, if the amount of the carbonaceous substance is too large, the renewable hearth could not have a predetermined level of strength and continuous supply of the hearth material would be required because the carbonaceous substance is burnt and worn in the furnace, thus resulting in an undesired result of increased cost. Using coal as the carbonaceous substance is more preferable in that ash in the coal additionally develops the effect as a binder for binding the high-melting-point material together and hence renders the renewable hearth to have an appropriate strength endurable to the operation of charging the raw-material agglomerates or the operation of discharging the metallic iron as a product and the slag Sg. When using coal with main intent to develop the binding effect of ash contained in the coal, the mixing ratio of the high-melting-point material to the carbonaceous substance may be selected so as to develop the desired binding effect without being limited to the above-mentioned mixing rate of the carbonaceous substance.

In the present invention, the hearth material may contain a sintering accelerator. Mixing a sintering accelerator in the hearth material is preferable in that the sintering accelerator develops the effect as a binder for binding the high-melting-point material together and hence renders the renewable hearth to have an appropriate strength endurable to the operation of charging the raw-material agglomerates or the operation of discharging the metallic iron as a product and the slag. The sintering accelerator is, e.g., a silica compound such as kaolin. However, any other suitable substance may also be used so long as it develops the effect as a binder.

The mixing rate of the sintering accelerator is not limited to a particular value so long as the binding effect can be developed, and it is usually in the range of about 3 to 15%. Because a silica compound or the like as an example of the sintering accelerator has low corrosion resistance against the molten slag, it is not preferred to mix a large amount of the sintering accelerator in the hearth material.

The grain size of the high-melting-point material, the carbonaceous substance and the sintering accelerator, which are contained in the hearth material, is not limited to a particular value, but it is recommended to be preferably not larger than 4 mm in average, more preferably not larger than 2 mm in average, from the viewpoints of suppressing infiltration of the molten slag and taking a proper balance between the strength endurable to the operation of charging the raw-material agglomerates or the operation of discharging the metallic iron as a product and the slag and easiness in removing the renewable hearth deteriorated area.

Figure 11:
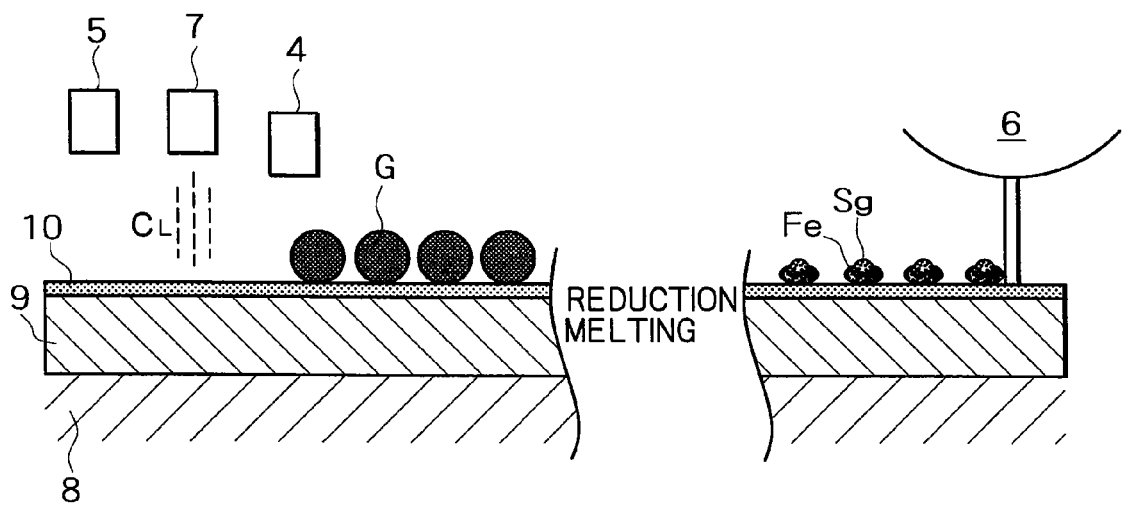
FIG. 11 is a schematic explanatory view showing an operation employing an atmosphere modifier.

As shown in FIG. 11, an atmosphere modifier containing a powdery carbonaceous substance may be laid in the form of a layer on the renewable hearth 9 prior to supply of the raw-material agglomerates, and the raw-material agglomerates G may be then supplied onto that layer. Forming a layer of an atmosphere modifier 10 is effective to suppress an oxidizing burner combustion gas, which contains $CO_2$ and $H_2O$, from impeding a reducing atmosphere in the vicinity of the raw-material agglomerates G and to efficiently promote reduction, carburizing and melting of the raw-material agglomerates G. Another effect is in that the amount of FeO remaining in the molten slag is reduced, and hence slag infiltration and erosion into the renewable hearth can be suppressed. In addition, since the atmosphere modifier enhances the reducing atmosphere in the vicinity of the raw-material agglomerates G and thereafter serves as fuel when burnt in the furnace, it is possible to reduce the amount of burner fuel consumed, such as natural gas. Furthermore, the atmosphere modifier serves to suppress the molten slag from infiltrating into the renewable hearth, to facilitate removal of the metallic iron Fe and the slag Sg from the renewable hearth, and to achieve smoother discharge out of the furnace.

Examples of the atmosphere modifier include coal powder, petrocoke powder, and coke breeze. The thickness of the atmosphere modifier is not limited to a particular value, and a very thin layer of the atmosphere modifier is enough to effectively develop the effects of enhancing the reducing atmosphere in the vicinity of the raw-material agglomerates and smoothing discharge of the metallic iron and the slag. Usually, the intended purposes can be obtained even with a thickness of about 1 to 10 mm. Additionally, it is desired that the atmosphere modifier be continuously supplied because it is burnt and worn in the furnace.

The grain size of the atmosphere modifier is not limited to a particular value, but the grain size is recommended to be preferably not larger than 5 mm in average, more preferably not larger than 2 mm in average.

The method of charging the hearth material is not limited to a particular one, but it is recommended that the hearth material be charged to lie on the hearth refractory at a uniform thickness using the powder supply apparatus 5 while the heart is rotated.

Also, mixing an appropriate amount of the hearth material in the atmosphere modifier is recommended as a simple manner to develop the effect of restoring the function of the renewable hearth deteriorated area. The hearth material mixed in the atmosphere modifier is moved up to the discharging device 6 with the rotation of the hearth, and is pressed into the surface layer of the renewable hearth deteriorated area under the action of the discharging device, whereby the function of the renewable hearth is restored. A mixing ratio of the hearth material to the atmosphere modifier is not limited to a particular value, but the mixing ratio is usually preferably in the range of 30 to 70%. If the mixing rate of the hearth material is too small, the effect of restoring the renewable hearth deteriorated area would be reduced. Conversely, if the mixing rate of the hearth material is too large, the effect of adjusting the atmosphere would be reduced. Mixing the hearth material in the atmosphere modifier is not always required, and the mixing may be performed only when restoring the function of the renewable hearth deteriorated area. Further, the method of mixing the hearth material in the atmosphere modifier is preferable in that the plant cost and the installation space can be reduced because one supply apparatus can be shared for supplying the hearth material and the atmosphere modifier.

Figure 12:
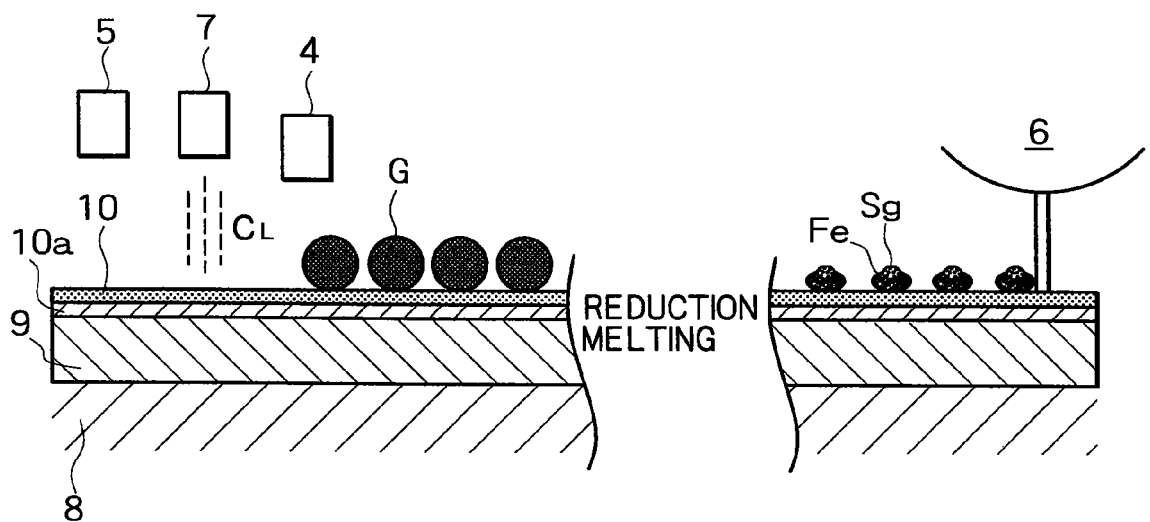
FIG. 12 is a schematic explanatory view showing an operation employing two layers of an atmosphere modifier.

FIG. 12 shows another process of the operation using an atmosphere modifier. An atmosphere modifier containing a powdery carbonaceous substance is laid in the form of two layers on the renewable hearth 9 prior to supply of the raw-material agglomerates, and the raw-material agglomerates G are then supplied onto those layers. In the process of the operation using no atmosphere modifier as shown in FIG. 7 or in the process of the operation in which the atmosphere modifier is laid in the form of one layer as shown in FIG. 11, the lower end of the blade of the discharging device 6 is always contacted with the surface of the renewable hearth, which is formed of the hearth material containing the high-melting-point material with high abrasiveness, such as alumina and magnesia, and therefore the blade end is remarkably worn. In the case of forming two layers of the atmosphere modifier, however, the blade end of the discharging device is positioned on an upper surface of the atmosphere modifier layer on the lower side and is kept from coming into direct contact with the renewable hearth having high abrasiveness. As a result, the life of the blade can be prolonged and the availability factor of the plant can be increased. Herein, the expression "forming two layers" means steps of forming a first layer of the atmosphere modifier, and leveling the surface of the first layer and then forming another (second) layer of the atmosphere modifier for convenience of the operation. By forming those two layers of the atmosphere modifier, the blade end of the discharging device can be held in contacted with the first layer of the atmosphere modifier layer and can be prevented from coming into direct contact with the renewable hearth. Accordingly, even when the atmosphere modifier is laid in the form of one layer, for example, the same purpose can be achieved by forming the atmosphere modifier as a thick layer to such an extent that the blade end can be held at a position not contacting with the renewable hearth, without forming the second layer. Also, in the case of forming two layers of the atmosphere modifier, it is a matter of choice in practice whether the composition of the atmosphere modifier is the same or not between the first and second layers.

Though not shown, the method of renewing the renewable hearth based on the process of the operation using an atmosphere modifier can be practiced similarly to the above-described method of renewing the renewable hearth based on the process of the operation using no atmosphere modifier.

As described above, when the renewable hearth is badly deteriorated, it sometimes happens that enlarged metallic iron cannot be sufficiently cooled and solidified in the cooling zone and reaches the discharge section while being in a molten iron state, whereby the operation can no longer be continued because of a difficulty in discharging such enlarged metallic iron out of the furnace by the discharging device. In that event, by supplying a coolant to the surface of the renewable hearth to solidify the molten iron, it is possible to discharge the molten iron and to continue the operation. In the present invention, the coolant is not limited to a liquid or gas, but may be a high-melting-point material, such as alumina and magnesia. The molten iron may be cooled and solidified, for example, by supplying the hearth material containing the high-melting-point material, such as alumina and magnesia, to an area of the molten iron. Alternatively, the molten iron may be cooled and solidified by providing a water spray device and supplying water to an area of the molten iron.

In the above-described step of removing the renewable hearth deteriorated area, the removal is not easy to perform depending on the nature of the renewable hearth, but the renewable hearth can be smoothly removed by softening it in such a case. The method of softening the renewable hearth is not limited to a particular one, and the renewable hearth can be softened by increasing the amount of burner combustion to raise the temperature in the furnace and then the temperature of the renewable hearth, or by providing a burner dedicated for directly heating the renewable hearth to raise the temperature of the renewable hearth. The temperature of the renewable hearth in that case is not limited to a particular value, but may be set as required depending on the nature of the renewable hearth. In the renewable hearth deteriorated area where infiltration of the molten slag has progressed, however, the temperature of the renewable hearth is preferably in the range of 1300 to 1550° C., more preferably in the range of about 1450 to 1550° C.

As another method, the renewable hearth may be softened by supplying to it, e.g., an additive that has the effect of lowering the melting point of the renewable hearth. Examples of such an additive include calcium oxide, sodium carbonate, and calcium fluoride.

Figure 13:
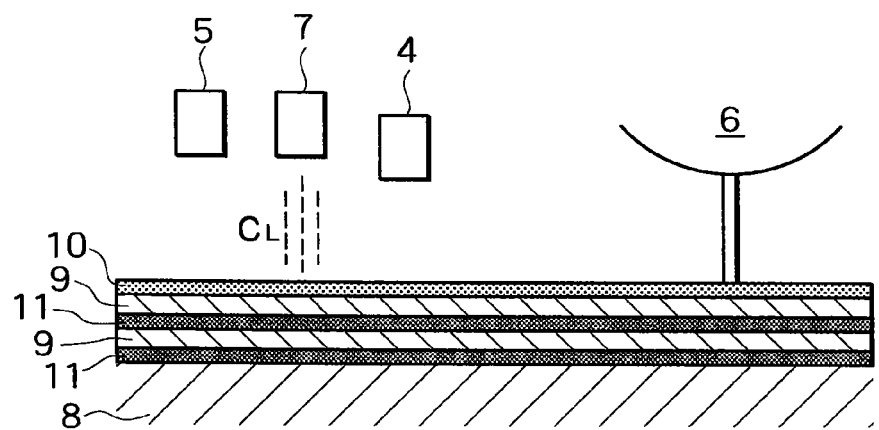
FIG. 13 is a schematic explanatory view showing an improvement of easiness in removing the renewable hearth with the aid of carbonaceous material layers.

From the viewpoint of facilitating removal of the renewable hearth deteriorated area, as shown in FIG. 13, a carbonaceous material layer 10a may be formed by laying a carbonaceous material, e.g., a powdery carbon substance, in the form of a layer between the hearth refractory 8 and the renewable hearth 9 or between the renewable hearth 9 and a renewable hearth laid on the renewable hearth 9. Anyway, the renewable hearth deteriorated area is removed by descending the blade end of the discharging device to any desired position in the carbonaceous material layer. Since the carbonaceous material layer usually provides a powdery brittle layer, the renewable hearth can be easily removed upon separation at the carbonaceous material layer.

While the raw-material agglomerates in the form of pellets are used as the raw-material mixture in the above description, the advantages of the present invention can also provided when a powdery material is used as the raw-material mixture.

The present invention will be described below in detail in connection with Example. It is, however, to be noted that the following Example is not purported to limit the present invention, and various modifications made without departing from the purports of the present invention mentioned above and below are all involved in the technical scope of the present invention.

EXAMPLES

Example 1

Agglomerates (diameter: about 16 mm) containing iron ore and coal were charged into the reduction melting furnace of the moving hearth type shown in FIG. 1, and then subjected to heating reduction in a solid state until a metallization rate of not less than about 90% was obtained, while the atmosphere temperature in the furnace was controlled to about 1350° C. The raw-material agglomerates were then melted in the melting zone (atmosphere temperature: 1450° C.). Metallic iron thus produced and slag as a by-product were cooled down to about 1000° C. for solidification, and then discharged out of the furnace by the discharging device (time from the charging of the raw materials to the discharge was about 12 minutes). Thus-obtained granular metallic iron (diameter: about 10 mm) had a high iron grade (iron: about 97% and carbon: about 3%).

Prior to the charging of the agglomerates, a hearth material was laid on the hearth in the form of a layer at a thickness of 15 mm through an auxiliary raw-material charging means (not shown), thereby forming a renewable hearth. Also, an atmosphere modifier (first layer, material: coal) was laid (thickness: 2 mm) on the renewable hearth and leveled by the discharging device. Further, an atmosphere modifier was laid (thickness: 3 mm) on the first layer of atmosphere modifier. Thereafter, the operation was started by supplying the agglomerates onto the two layers of atmosphere modifier. After the cooling and solidifying steps, the metallic iron, etc. were recovered by the discharging device provided at the most downstream side. On that occasion, the blade end (lower end) of the discharging device was positioned on the surface of the first layer of the atmosphere modifier layer, and the atmosphere modifier remaining in the second layer was discharged together with the metallic iron. The atmosphere modifier forming the second layer was always supplied prior to the supply of the raw materials. Further, the blade end of the discharging device was descended to the surface of the renewable hearth once per day for discharging the first layer of the atmosphere modifier and removing the metallic iron and the slag residing on the surface of the renewable hearth. Then, the hearth material was added to restore the function of the renewable hearth deteriorated area, and two layers of the atmosphere modifier (which were the same as the above-mentioned first and second layers of the atmosphere modifier at the start of the operation) were formed again. The operation was continued in a similar way by repeating the above steps. After two weeks from the start of the operation, the blade end of the discharging device was descended 5 mm from the surface of the renewable hearth to remove the deteriorated area in the surface layer of the renewable hearth. Then, after forming the renewable hearth, the first layer of the atmosphere modifier, and the second layer of the atmosphere modifier again (which were the same as those formed at the start of the operation), the operation was continued in a similar way by repeating the above steps. In this Example, the operation was continued for three weeks. As a result, the stable continuous operation was realized and a high availability factor (91%) was obtained.

Comparative Example

Metallic iron was produced in the same manner as in above Example except that the renewable hearth and the atmosphere modifier layers both formed at the start of the operation were neither removed nor renewed. After two days from the start of the operation, the surface of a part of the hearth layer was softened, and a pool of residing molten iron was formed. Thus, the hearth had to be repaired under shutdown of the operation, and the stable continuous operation was not obtained.

INDUSTRIAL APPLICABILITY

According to the present invention constructed as described above, the availability factor of a hearth can be drastically increased and the long-term stable operation of producing metallic iron can be achieved by charging a hearth material to lie in the form of a layer on a hearth refractory prior to supply of a raw-material mixture, thereby forming a renewable hearth capable of being renewed, and by removing the whole or a part of the renewable hearth, which has deteriorated with continued operation upon infiltration of molten slag, burying of metallic iron and slag into the renewable hearth, or formation of a dent due to peeling and hollowing, or by charging a new hearth material to restore the function of the renewable hearth.

The invention claimed is:

1. A method for producing metallic iron, the method comprising:

in a reduction melting furnace, laying a hearth material in the form of a layer to form a renewable movable hearth capable of being renewed, without supplying iron oxides onto the hearth;

after forming the renewable hearth, supplying a mixture containing a carbonaceous reducing agent and iron oxides onto the hearth, heating the mixture for reduction melting of the iron oxides, cooling thus-obtained metallic iron, and discharging the metallic iron to the outside of said furnace for recovery, removing at least part of said renewable hearth after discharging the metallic iron to the outside of said furnace for recovery, and renewing a part or the whole of said renewable hearth, which has deteriorated during operation, with the hearth material, by supplying the hearth material after removing at least part of said renewable hearth.

2. A method for producing metallic iron, the method comprising:

in a reduction melting furnace, laying a hearth material in the form of a layer to form a renewable movable hearth capable of being renewed, without supplying iron oxides onto the hearth;

after forming the renewable hearth, supplying a mixture containing a carbonaceous reducing agent and iron oxides onto the hearth, heating the mixture for reduction melting of the iron oxides, cooling thus-obtained metallic iron, discharging the metallic iron to the outside of said furnace for recovery, removing at least part of said renewable hearth after discharging the metallic iron to the outside of said furnace for recovery, and renewing a hearth surface by charging the hearth material to lie in the form of a layer on said renewable hearth which has deteriorated during operation, or by supplying the hearth material onto the surface of the deteriorated renewable hearth, by supplying the hearth material after removing at least part of said renewable hearth.

3. The producing method according to claim 2, wherein the hearth material is filled in dents formed in the surface of the hearth layer during operation of said reduction melting furnace.

4. The producing method according claim 1, wherein a thickness of said renewable hearth is adjusted.

5. A method for producing metallic iron, the method comprising:

in a reduction melting furnace, laying a hearth material containing a substance having a high melting point and being corrosion-resistant against produced slag, in the form of a layer to form a renewable movable hearth capable of being renewed, without supplying iron oxides onto the hearth;

after forming the renewable hearth, supplying a mixture containing a carbonaceous reducing agent and iron oxides onto the hearth, heating the mixture for reduction melting of the iron oxides, cooling thus-obtained metallic iron, and discharging the metallic iron to the outside of said furnace for recovery, removing at least part of said renewable hearth after discharging the metallic iron to the outside of said furnace for recovery, and renewing a part or the whole of said renewable hearth, which has deteriorated during operation, with the hearth material, wherein the hearth material further contains a sintering accelerator after removing at least part of said renewable hearth.

6. The producing method according to claim 5, wherein the hearth material further contains a carbonaceous substance.

7. The producing method according to claim 5, wherein the substance having a high melting point contains oxides including alumina and/or magnesia, or silicon carbide.

8. A method for producing metallic iron, the method comprising:

in a reduction melting furnace, laying a hearth material in the form of a layer to form a renewable movable hearth capable of being renewed, without supplying iron oxides onto the hearth;

after forming the renewable hearth, supplying a mixture containing a carbonaceous reducing agent and iron oxides onto the renewable hearth capable of being renewed, heating the mixture for reduction melting of the iron oxides, cooling thus-obtained metallic iron, and discharging the metallic iron to the outside of said furnace for recovery, supplying a coolant to said renewable hearth, which has deteriorated during operation, to solidify molten iron residing on the surface of said renewable hearth, removing said renewable hearth together with the solidified residing iron after discharging the metallic iron to the outside of said furnace for recovery, and renewing a part or the whole of said removed renewable hearth with the hearth material, by supplying the hearth material after removing said renewable hearth.

9. The producing method according to claim 8, wherein said renewable hearth is softened before renewing said renewable hearth.

10. The producing method according to claim 1, wherein after charging the hearth material to lie in the form of a layer on said hearth to form said renewable hearth, an atmosphere modifier containing a powdery carbonaceous substance is laid in the form of a layer and the mixture is then supplied.

11. The producing method according to claim 10, wherein the hearth material is mixed in said atmosphere modifier.

12. The producing method according to claim 10, wherein said atmosphere modifier is laid in the form of two or more layers.

13. The producing method according to claim 1, wherein a carbonaceous material layer is provided between said hearth and said renewable hearth or between said renewable hearth and a renewable hearth supplied onto said renewable hearth.

14. A method for producing metallic iron, the method comprising:

in a reduction melting furnace, laying a hearth material containing a substance having a high melting point and being corrosion-resistant against produced slag, in the form of a layer to form a renewable movable hearth capable of being renewed, without supplying iron oxides onto the hearth;

after forming the renewable hearth, supplying a mixture containing a carbonaceous reducing agent and iron oxides onto the hearth, heating the mixture for reduction melting of the iron oxides, cooling thus-obtained metallic iron, discharging the metallic iron to the outside of said furnace for recovery, removing at least part of said renewable hearth after discharging the metallic iron to the outside of said furnace for recovery, and renewing a hearth surface by charging the hearth material to lie in the form of a layer on said renewable hearth which has deteriorated during operation, or by supplying the hearth material onto the surface of the deteriorated renewable hearth after removing at least part of said renewable hearth, wherein the hearth material further contains a sintering accelerator.

15. A method for producing metallic iron, the method comprising:

in a reduction melting furnace, laying a hearth material containing a substance having a high melting point and being corrosion-resistant against produced slag, in the form of a layer to form a renewable movable hearth capable of being renewed, without supplying iron oxides onto the hearth;

after forming the renewable hearth, supplying a mixture containing a carbonaceous reducing agent and iron oxides onto the renewable hearth capable of being renewed, heating the mixture for reduction melting of the iron oxides, cooling thus-obtained metallic iron, and discharging the metallic iron to the outside of said furnace for recovery, supplying a coolant to said renewable hearth, which has deteriorated during operation, to solidify molten iron residing on the surface of said renewable hearth, removing said renewable hearth together with the solidified residing iron after discharging the metallic iron to the outside of said furnace for recovery, and renewing a part or the whole of said removed renewable hearth with the hearth material, wherein the hearth material further contains a sintering accelerator.

* * * * *